(12) United States Patent
Ohtsu

(10) Patent No.: US 6,341,828 B1
(45) Date of Patent: Jan. 29, 2002

(54) BRAKE CONTROL SYSTEM AND METHOD

(75) Inventor: Nobuyuki Ohtsu, Kanagawa (JP)

(73) Assignee: Unisia Jecs Corporation, Kanagawa (JP)

( * ) Notice: Subject to any disclaimer, the term of this patent is extended or adjusted under 35 U.S.C. 154(b) by 0 days.

(21) Appl. No.: 09/564,207

(22) Filed: May 4, 2000

(30) Foreign Application Priority Data

May 19, 1999 (JP) ............................................. 11-138994

(51) Int. Cl.$^7$ ................................................. B60T 8/00
(52) U.S. Cl. ......................................... 303/171; 303/173
(58) Field of Search ................................. 303/166, 167, 303/171–178

(56) References Cited

FOREIGN PATENT DOCUMENTS

| JP | 7-329759 | 12/1995 |
|---|---|---|
| JP | 8-332941 | 12/1996 |

*Primary Examiner*—Christopher P. Schwartz
(74) *Attorney, Agent, or Firm*—Sughrue Mion, PLLC

(57) ABSTRACT

A brake control system is constructed to obtain a pseudo body velocity in accordance with outputs of wheel-velocity sensors, to control said brake unit in accordance with a difference between each wheel velocity and the pseudo body velocity to reduce the pressures within wheel cylinders for ABS control, to determine that one of the outputs of the wheel-velocity sensors is abnormal when a pressure-reduction time measured during ABS control exceeds a predetermined value, and to form the pseudo body velocity, if an anomaly of one of the outputs of the wheel-velocity sensors is determined, in accordance with the outputs of the wheel-velocity sensors excluding the abnormal wheel-velocity sensor.

11 Claims, 5 Drawing Sheets

BRAKE CONTROL SYSTEM AND METHOD

BACKGROUND OF THE INVENTION

The present invention relates to brake control system and method for motor vehicles, which allow antilock (ABS) controlled braking for preventing wheels from being locked by controlling the brake-fluid pressure. Particularly, the present invention relates to the brake control system and method that ensure correct ABS control even when a wheel-velocity sensor falls abnormal.

In brake control systems for allowing ABS controlled braking, a pseudo vehicle-body velocity is estimated in accordance with a velocity of each wheel, and a reduction, a retention and an increase in the brake-fluid pressure are carried out in accordance with the pseudo body velocity and the wheel velocity to prevent wheels from being locked during braking, obtaining both secured steerability and running stability and shortened braking distance.

In the systems, the detection accuracy of the wheel velocity is important for ABS control. Thus, if a wheel-velocity sensor falls abnormal, correct ABS control is difficult to carry out. In view of this, brake control systems are proposed wherein an anomaly of the wheel-velocity sensor is detected to carry out ABS control taking account of this anomaly.

One of such brake control systems is disclosed in JP-A 8-332941. The system includes anomaly detecting means for detecting an anomaly of a velocity of a wheel and for making, when detecting its anomaly, estimated body-velocity calculating means calculate an estimated body velocity in accordance with velocities of the wheels excluding an abnormal wheel. The anomaly detecting means carry out determination such that when the wheel velocity calculated in this control cycle is greater than that one calculated in the preceding control cycle by a predetermined value, i.e. the fluctuation rate of the wheel velocity is greater than a predetermined value, the wheel velocity is abnormal.

Thus, with the system, even if output of the wheel-velocity sensor is greater due to noise superimposed thereon, the estimated body velocity is not greater than the actual body velocity, preventing needless ABS control that results in a needless reduction in the brake-fluid pressure. Moreover, even when the wheel velocity returns abruptly after occurrence of a great wheel skid, erroneous determination is not carried out which the wheel velocity is abnormal, preventing needless ABS control that results in a needless reduction in the brake-fluid pressure.

JP-A 7-329759 discloses detection of noise superimposed on the wheel velocity in accordance with the frequency.

However, due to their structure that an anomaly of the wheel velocity is determined in accordance with the fluctuation rate or the frequency of noise superimposed on the wheel velocity, the above brake control systems cannot detect an anomaly when noise is superimposed having the fluctuation rate smaller than a predetermined value or the frequency out of a predetermined frequency range, which may result in the following problem:

During ABS control, noise with the relatively low fluctuation rate and the low frequency is superimposed on the wheel velocity, the pseudo body velocity increases with a rise in the wheel velocity with noise superimposed, and a reduced-pressure threshold value $\lambda$ obtained from a pseudo body velocity Vi increases as well. Thus, a velocity VwB of the three normal wheels is smaller than the reduced-pressure threshold value $\lambda$, so that a pressure reduction is carried out with regard to the three normal wheels or the four wheels dependent on the form of ABS control. In the latter case, even with a pressure reduction of each normal wheel, the wheel velocity VwB returns to a real wheel velocity, but not to the pseudo body velocity Vi with noise superimposed, this pressure reduction may be carried out endlessly, resulting in insufficient achievement of deceleration.

It is, therefore, an object of the present invention to provide brake control system and method for allowing ABS controlled braking, which contribute to an improvement in the control quality.

SUMMARY OF THE INVENTION

One aspect of the present invention lies in providing a motor vehicle, comprising:

wheels;

wheel cylinders arranged with said wheels;

a brake unit that controls pressures within said wheel cylinders;

wheel-velocity sensors that detect velocities of said wheels; and a control unit connected to said brake unit and said wheel-velocity sensors, said control unit being so constructed as to:

obtain a pseudo body velocity in accordance with outputs of said wheel-velocity sensors, control said brake unit in accordance with a difference between each of said wheel velocities and said pseudo body velocity to reduce said pressures for ABS control, determine that one of said outputs of said wheel-velocity sensors is abnormal when a pressure-reduction time measured during ABS control exceeds a predetermined value, and form said pseudo body velocity, if an anomaly of said one of said outputs of said wheel-velocity sensors is determined, in accordance with said outputs of said wheel-velocity sensors excluding said abnormal wheel-velocity sensor.

Another aspect of the present invention lies in providing a method of controlling a motor vehicle provided with wheels, wheel cylinders, a brake unit for controlling pressures within the wheel cylinders, and wheel-velocity sensors for detecting velocities of the wheels, the method comprising the steps of:

obtaining a pseudo body velocity in accordance with outputs of the wheel-velocity sensors;

controlling the brake unit in accordance with a difference between each of said wheel velocities and said pseudo body velocity to reduce the pressures for ABS control;

determining that one of said outputs of the wheel-velocity sensors is abnormal when a pressure-reduction time measured during ABS control exceeds a predetermined value; and forming said pseudo body velocity, if an anomaly of said one of said outputs of the wheel-velocity sensors is determined, in accordance with said outputs of the wheel-velocity sensors excluding the abnormal wheel-velocity sensor.

Still another aspect of the present invention lies in providing a motor vehicle, comprising:

wheels;

wheel cylinders arranged with said wheels;

a brake unit that controls pressures within said wheel cylinders;

wheel-velocity sensors that detect velocities of said wheels;

means for obtaining a pseudo body velocity in accordance with outputs of said wheel-velocity sensors;

means for controlling said brake unit in accordance with a difference between each of said wheel velocities and said pseudo body velocity to reduce said pressures for ABS control;

means for determining that one of said outputs of said wheel-velocity sensors is abnormal when a pressure-reduction time measured during ABS control exceeds a predetermined value; and means for forming said pseudo body velocity, if an anomaly of said one of said outputs of said wheel-velocity sensors is determined, in accordance with said outputs of said wheel-velocity sensors excluding said abnormal wheel-velocity sensor.

DETAILED DESCRIPTION OF THE INVENTION

Figure 1:
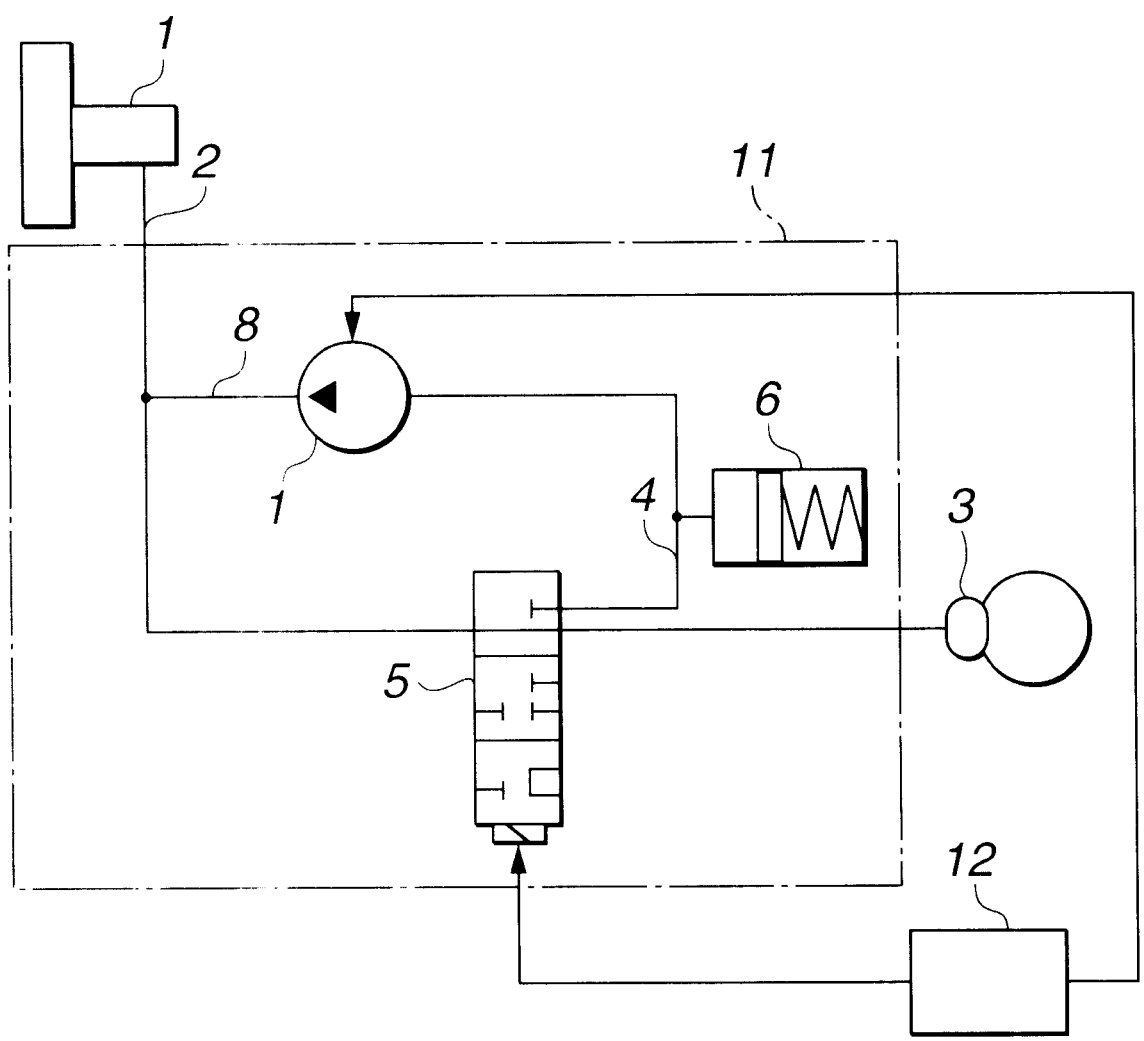
FIG. 1 is a hydraulic circuit diagram showing part of a brake control system according to the present invention.

Referring to FIG. 1, a brake control system for a motor vehicle embodying the present invention comprises a master cylinder 1 for producing the hydraulic pressure when a driver depresses a brake pedal, not shown. The master cylinder 1 is connected to a wheel cylinder 3 through a brake circuit 2. A solenoid-operated selector valve 5 is arranged with the brake circuit 2 to allow switching between the increased-pressure state wherein the upstream or master-cylinder side of the brake circuit 2 communicates with the downstream or wheel-cylinder side thereof, the reduced-pressure state where brake fluid within the wheel cylinder 3 is released into a drain circuit 4, and the retained-pressure state where the brake-fluid pressure within the wheel cylinder 3 is retained with the brake circuit 2 being interrupted. Thus, the brake-fluid pressure within the wheel cylinder 3 can be controlled arbitrarily by switching of the selector valve 5.

A reservoir 6 is arranged with the drain circuit 4 to allow storage of brake fluid. A circulating circuit 8 is arranged to connect the reservoir 6 and an upstream position of the brake circuit 2 with respect to the selector valve 5. A pump 7 is arranged with the circulating circuit 8 to circulate brake fluid within the reservoir 6 to the brake circuit 2.

Figure 2:
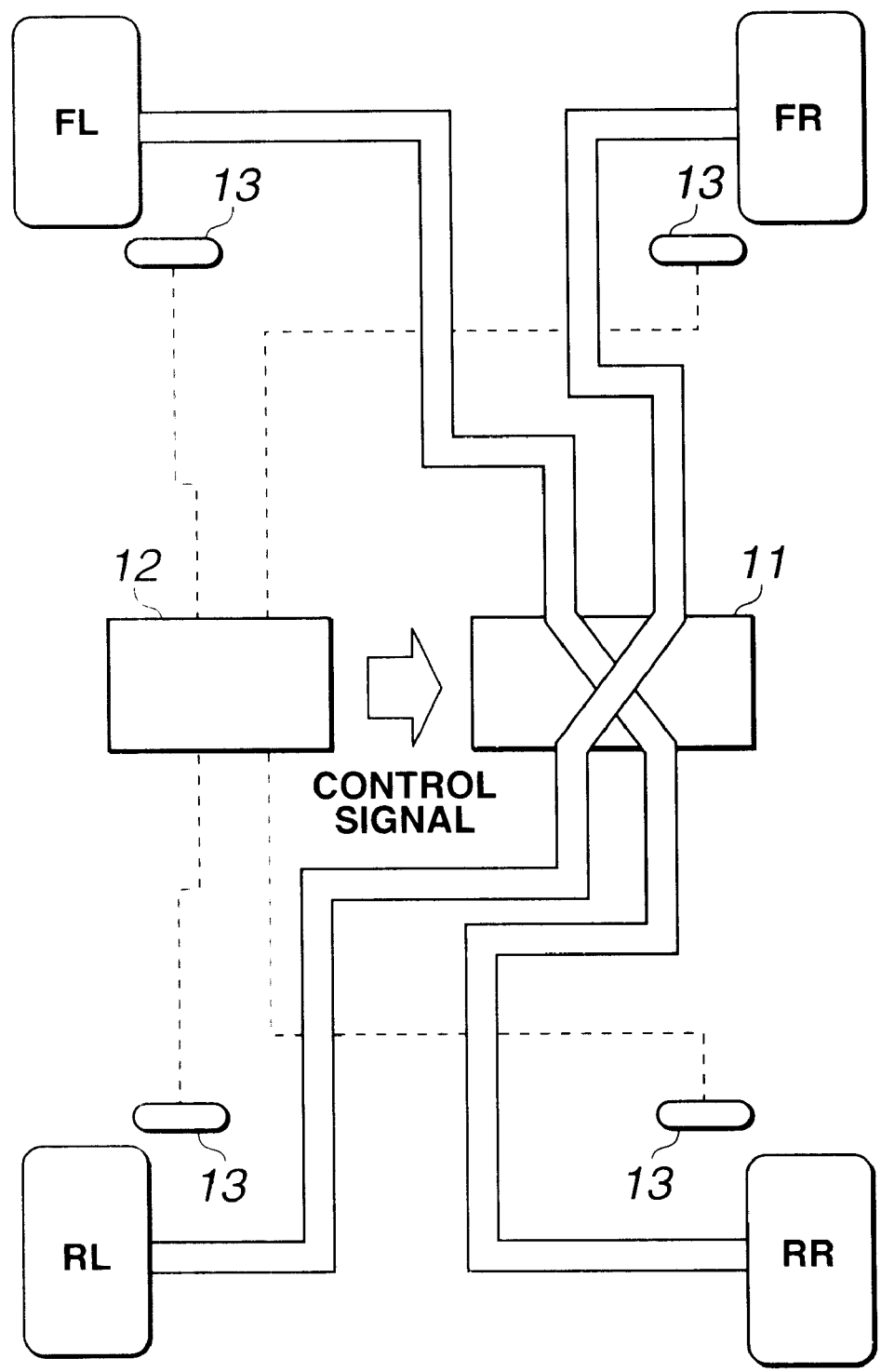
FIG. 2 is a schematic view showing the whole of the brake control system.

FIG. 1 shows a structure for one wheel, wherein the components surrounded by the one-dot chain line constitute a brake unit 11. Referring to FIG. 2, which shows a structure for four wheels FR, FL, RR, RL, the brake unit 11 can control the brake-fluid pressure within the wheel cylinder 3, not shown in FIG. 2, of each wheel FR, FL, RR, RL. It is noted that a motor vehicle to which the present invention is applied is a rear-drive vehicle having the rear wheels RR, RL as driving wheels.

A control unit 12 is arranged to control operations of the selector valve 5 and the pump 7 in the brake unit 11. The control unit 12 inputs a signal out of a wheel-velocity sensor 13 for detecting a rotational speed of each wheel FR, FL, RR, RL.

Figure 3:
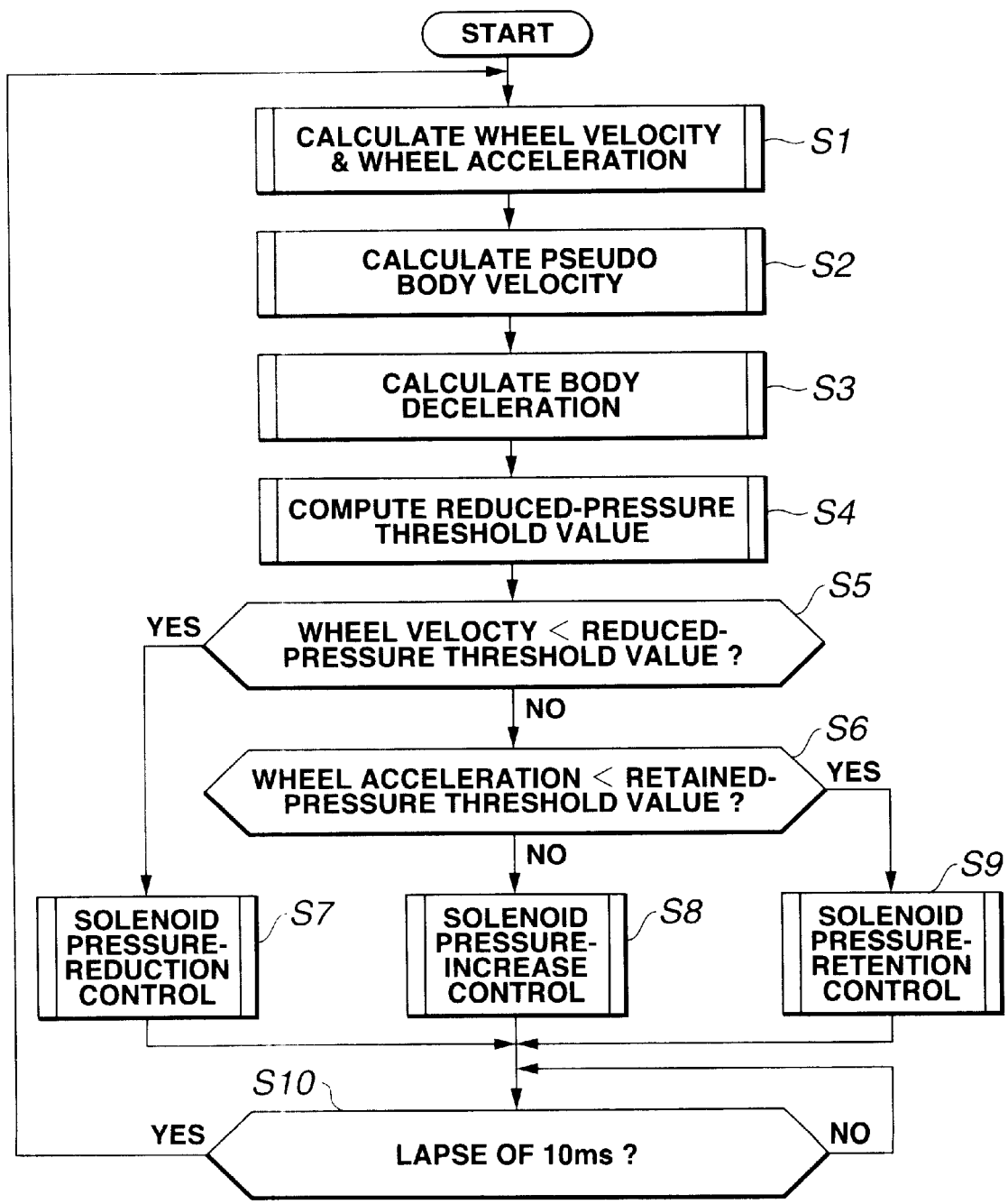
FIG. 3 is a flowchart showing ABS control carried out by the brake control system.

Referring to FIG. 3, brake control of the brake control system will be described. The brake control is pertinent to ABS control that prevents the wheels FR, FL, RR, RL from being locked by controlling the brake-fluid pressure. The brake control is carried out at intervals of 10 msec.

At a step S1, a sensor frequency is obtained from a sensor-pulse number ND of each wheel-velocity sensor 13 produced every 10 msec and a period TD to calculate a wheel velocity Vw and a wheel acceleration ΔVw. Refer hereafter the front-right, front-left, rear-right, and rear-left wheel velocities to as VwFR, VwFL, VwRR, and VwRL.

At a step S2, a pseudo vehicle-body velocity Vi is calculated, a detail of calculation of which will be described later.

At a step S3, a body deceleration ΔV is calculated in accordance with the rate of change of the pseudo body velocity Vi.

At a step S4, a reduced-pressure threshold value λ is computed, which is a value pertinent to execution of a pressure reduction. Specifically, when the wheel velocity Vw is lower than the reduced-pressure threshold value λ, a pressure reduction is carried out. By way of example, using a select wheel velocity Vfs that is the highest of the velocities of the four wheels FR, FL, RR, RL, the reduced-pressure threshold value λ is obtained in accordance with a formula:

$$\lambda = A \cdot Vfs - B$$

where A and B are coefficients of any number determined so that the reduced-pressure threshold value λ is partly lower than the select wheel velocity Vfs to obtain a skid rate suitable for production of a braking force.

At a step S5, it is determined whether or not the wheel velocity Vw is lower than the reduced-pressure threshold value λ. If the answer at the step S5 is YES, flow proceeds to a step S7 where the selector valve 5 is switched to the reduced-pressure state to carry out pressure-reduction control for reducing the pressure within the wheel cylinder 3.

On the other hand, if the answer at the step S5 is NO, i.e. it is determined that Vw>λ, flow proceeds to a step S6 where it is determined whether or not the wheel acceleration ΔVw is lower than a predetermined retained-pressure threshold value. If the answer at the step S6 is NO, it is determined that the wheel velocity Vw returns, and flow proceeds to a step S8 where the selector valve 5 is switched to the increased-pressure state to carry out pressure-increase control for increasing the pressure within the wheel cylinder 3. On the other hand, if the answer at the step S6 is YES, flow proceeds to a step 9 where the selector valve 5 is switched to the retained-pressure state to carry out pressure-retention control for retaining the pressure within the wheel cylinder 3.

It is noted that command times TGEN, TZOU are set with regard to each processing at the steps S7–S9, so that by valve-output processing at a step S10, a control signal is output to the selector valve 5 actually.

At the step S10, it is determined whether or not 10 ms elapsed. If the answer at the step S10 is YES, flow returns to the step S1.

Figure 4:
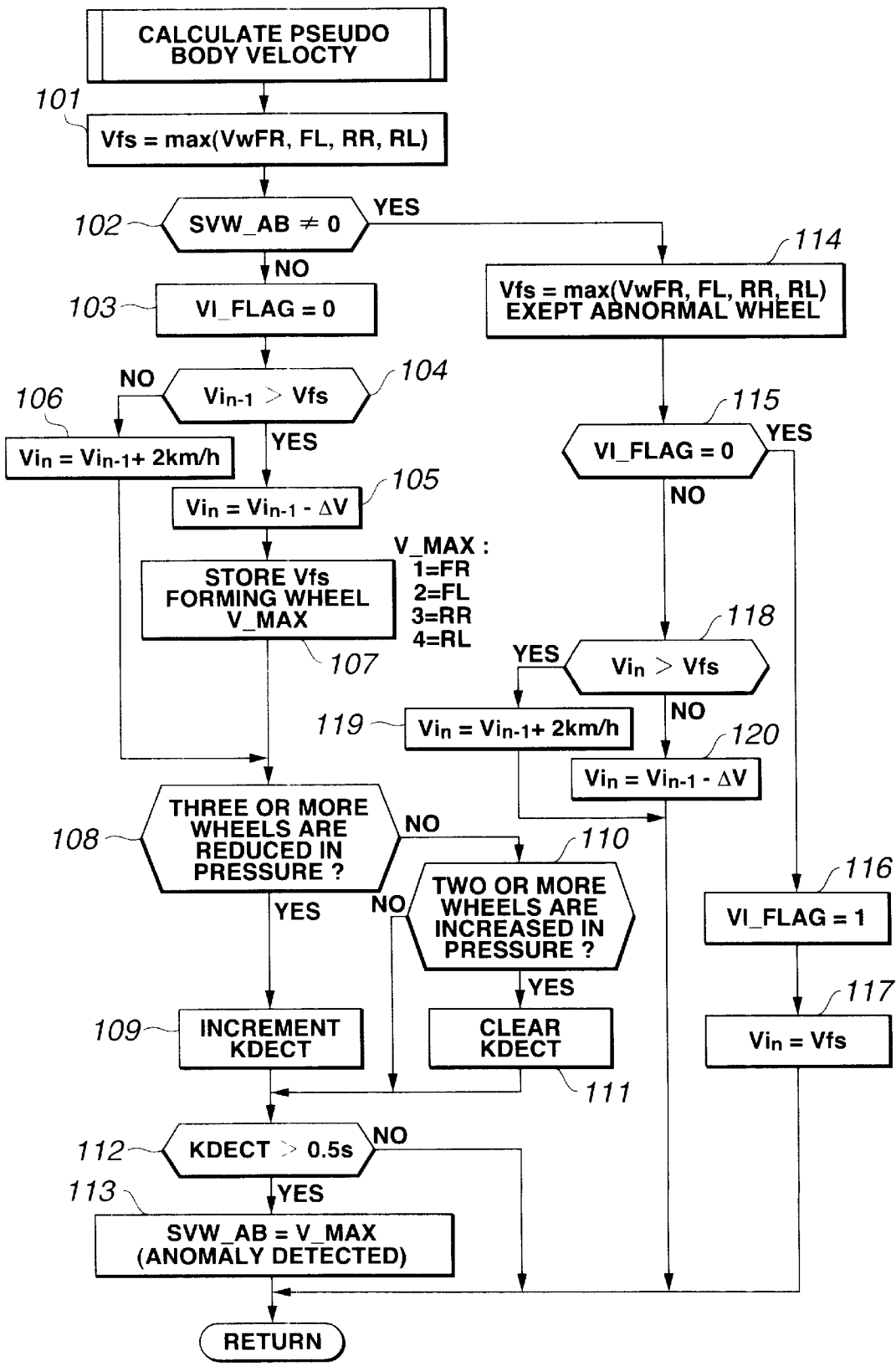
FIG. 4 is a view similar to FIG. 3, showing calculation of a pseudo body velocity carried out by the brake control system.

Referring to FIG. 4 calculation of the pseudo body velocity Vi at the step S2 will be described.

At a step 101, the select wheel velocity Vfs is formed out of the highest max (VwFR, FL, RR, RL) of the velocities of the four wheels FR, FL, RR, RL.

At a step 102, it is determined whether or not an anomaly confirmation signal SVW_AB is set, i.e. SVW_AB≠0. If the answer at the step 102 is NO, i.e. it is determined that SVW_AB=0, flow proceeds to a step 103 where an anomaly flag VI_FLAG is reset to zero.

At a step 104, it is determined whether or not a preceding pseudo body velocity Vin−1 is greater than the (actual) select wheel velocity Vfs, i.e. the vehicle is in deceleration. If the answer at the step 104 is YES, i.e. it is determined that the vehicle is in deceleration, flow proceeds to a step 105 where an actual pseudo wheel velocity Vin is obtained by subtracting the body deceleration ΔV from the preceding wheel velocity Vin−1. On the other hand, if the answer at the step 104 is NO, i.e. it is determined that the vehicle is in acceleration, flow proceeds to a step 106 where the actual pseudo wheel velocity Vin is obtained by adding a predetermined value, e.g. 2 km/h, to the preceding wheel velocity Vin−1. At a step 107 subsequent to the step 105, stored is a wheel V_MAX based on which the select wheel velocity Vfs is formed. Upon storage, numbers are assigned to the wheels: 1 to the front-right wheel FR, 2 to the front-left wheel FL, 3 to the rear-right wheel RR, and 4 to the rear-left wheel RL.

At a step 108, it is determined whether or not a pressure reduction is carried out with regard to three or more wheels. If the answer at the step 108 is YES, flow proceeds to a step 109 where a pressure-reduction time counter KDECT is incremented. On the other hand, if the answer at the step 108 is NO, flow proceeds to a step 110 where it is determined whether or not a pressure increase is carried out with regard to two or more wheels. If the answer at the step 110 is YES, flow proceeds to a step 111 where the pressure-reduction time counter KDECT is cleared.

At a step 112, it is determined whether or not the pressure-reduction time counter KDECT is greater than a predetermined value, e.g. 0.5 sec. If the answer at the step 112 is NO, one flow comes to an end. On the other hand, if the answer at the step 112 is YES, flow proceeds to a step 113 where the anomaly confirmation signal SVW_AB is set to V_MAX to show occurrence of an anomaly.

At the step 102, if the answer is YES, i.e. it is determined that SVW_AB≠0, flow proceeds to a step 114 where the select wheel velocity Vfs is formed out of the highest max (VwFR, FL, RR, RL) of the velocities of the four wheels FR, FL, RR, RL excluding an abnormal wheel. At a subsequent step 115, it is determined whether or not the anomaly flag VI_FLAG fails to be set, i.e. VI_FLAG=0. If the answer at the step 115 is YES, flow proceeds to a step 116 where the anomaly flag VI_FLAG is set, i.e. VI_FLAG=1. At a subsequent step 117, the actual pseudo body velocity Vin is set to the select wheel velocity Vfs. Then, one flow comes to an end.

At the step 115, if the answer is NO, i.e. VI_FLAG≠0, flow proceeds to a step 118 where it is determined whether or not the actual pseudo body velocity Vin is greater than the select wheel velocity Vfs. If the answer at the step 118 is YES, i.e. it is determined that the vehicle is in acceleration, flow proceeds to a step 119 where the actual pseudo body velocity Vin is obtained by adding a predetermined value, e.g. 2 km/h, to the preceding wheel velocity Vin−1. On the other hand, if the answer at the step 118 is NO, i.e. it is determined that the vehicle is in deceleration, flow proceeds to a step 120 where the actual pseudo wheel velocity Vin is obtained by subtracting the body deceleration ΔV from the preceding wheel velocity Vin−1.

Figure 5:
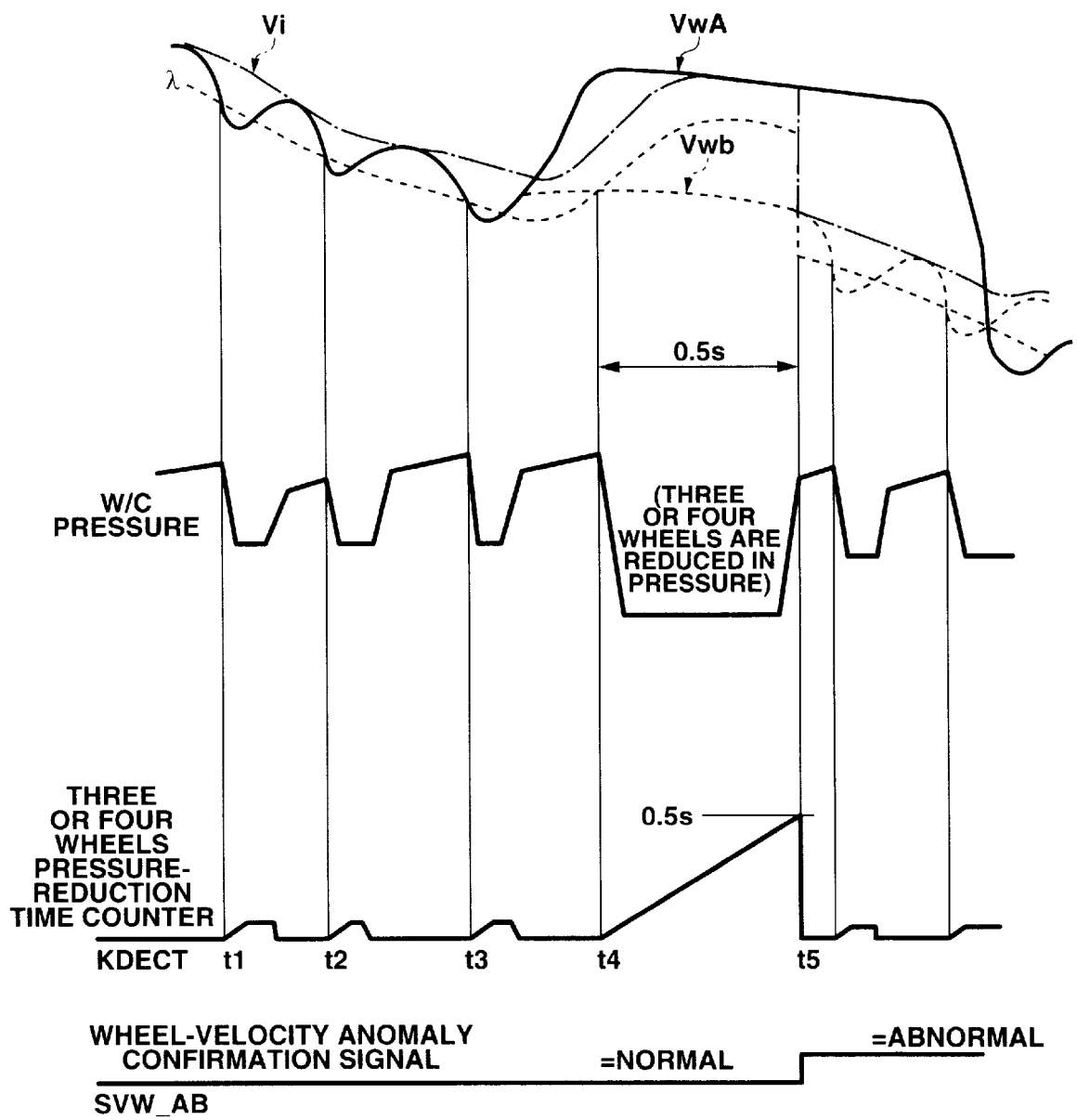
FIG. 5 is a time chart showing an example of operation of the brake control system.

Referring to FIG. 5, an example of operation of the brake control system will be described.

FIG. 5 shows a case where when carrying out ABS control during deceleration, an output value VwA of one wheel-velocity sensor 13 increases due to noise superimposed on its output. During a period of time from a point t1 to a point t3, there is no anomaly of output of any wheel-velocity sensor 13, and a pressure reduction, a pressure retention and a pressure increase are repeatedly carried out. The pressure-reduction time counter KDECT is incremented when a pressure reduction or a pressure retention is carried out, and it is cleared whenever a pressure increase is carried out, so that its count value cannot exceed a set value of 0.5 sec.

Then, a wheel velocity VwB increases due to noise superimposed. At this point, the anomaly confirmation signal SVW_AB is not set, so that the select wheel velocity Vfs is formed out of the highest max (VwFR, FL, RR, RL) of the velocities of the four wheels FR, FL, RR, RL. Thus, the pseudo body velocity Vi increases with the velocity of an abnormal wheel, and the reduced-pressure threshold value λ also increases with this. Therefore, the velocity VwB of the normal wheels is smaller than the reduced-pressure threshold value λ, so that at a point t4, a pressure reduction is started with regard to the three normal wheels or the four wheels dependent on the form of ABS control.

When a pressure reduction is started in such a way with regard to three or more wheels, the pressure-reduction time counter KDECT is incremented by processing from the step 108 to the step 109. Increment of the pressure-reduction time counter KDECT is continuously carried out during a pressure reduction. In the case as shown in FIG. 5, due to noise superimposed, a pressure reduction is continuously carried out with regard to the normal wheels. And at a point t5 where a count value of the pressure-reduction time counter KDECT is greater than a set value, the anomaly confirmation signal SVW_AB is set by processing from the step 112 to the step 113. After setting of the anomaly confirmation signal SVW_AB, the pseudo body velocity Vi is obtained from the highest max (VwFR, FL, RR, RL) of the velocities of the normal wheels excluding an abnormal wheel by processing from the step 102 to the step 114.

Thus, the pseudo body velocity Vi is substantially equal to the velocity VwB of the normal wheels, resulting in interruption of a pressure reduction and execution of a pressure increase. After setting of the anomaly confirmation signal SVW_AB, the pseudo body velocity Vi is obtained as follows. At first flow after anomaly determination, by processing from the step 115 to the step 117, the pseudo body velocity Vi is obtained from the select wheel velocity Vfs formed at the step 114 based on the normal wheels. At second flow after anomaly determination, by processing from the step 115 to the step 119 or 120, the pseudo body velocity Vi is obtained from the preceding pseudo body velocity Vi formed based on the normal wheels.

As described above, according to the present invention, an anomaly can be detected with regard to noise with relatively low fluctuation rate that the conventional systems could not discern from a normal signal, or noise of external magnetic field with frequency out of a predetermined frequency range. This contributes not only to prevention of elongated braking distance due to excessive pressure reduction, but to improvement in the control quality due to enhanced anomaly detection accuracy.

Moreover, according to the present invention, after anomaly determination, brake control does not use the preceding pseudo body velocity Vi obtained based on the wheels including an abnormal wheel, but the pseudo body velocity Vi obtained from the select wheel velocity Vfs formed based on the wheels excluding an abnormal wheel. This contributes to improvement in the control accuracy due to high accuracy of the pseudo body velocity Vi.

Having described the present invention with regard to the preferred embodiment, it is noted that the present invention is not limited thereto, and various changes and modifications can be made without departing from the scope of the present invention.

By way of example, in the embodiment, when the pressure-reduction time exceeds 0.5 sec, it is determined that an anomaly occurs. Alternatively, the pressure-reduction time may be set to an arbitrary value.

Further, in the embodiment, the select wheel velocity Vfs is formed out of the highest max (VwFR, FL, RR, RL) of the velocities of the four wheels FR, FL, RR, RL. Alternatively, the select wheel velocity Vfs may be formed out of the second highest velocity. In this case, upon anomaly determination, it may be formed out of the second highest of the velocities of the normal wheels excluding an abnormal wheel.

Furthermore, in the embodiment, one selector valve 5 is arranged to carry out a reduction, a retention and an increase in the pressure within the wheel cylinder 3. Alternatively, in place of the selector valve 5, there may be arranged a normally-open two-position inlet valve that allows opening and closing of the brake circuit 2, and a normally-closed two-position outlet valve that allows opening and closing of the drain circuit 4.

The entire contents of Japanese Patent Application 11-138994 are incorporated herein by reference.

What is claimed is:

1. A motor vehicle, comprising:
    wheels;
    wheel cylinders arranged with said wheels;
    a brake unit that controls pressures within said wheel cylinders;
    wheel-velocity sensors that detect velocities of said wheels; and
    a control unit connected to said brake unit and said wheel-velocity sensors, said control unit being so constructed as to:
    obtain a pseudo body velocity in accordance with outputs of said wheel-velocity sensors,
    control said brake unit in accordance with a difference between each of said wheel velocities and said pseudo body velocity to reduce said pressures for ABS control,
    determine that one of said outputs of said wheel-velocity sensors is abnormal when a pressure-reduction time measured during ABS control exceeds a predetermined value, and
    form said pseudo body velocity, if an anomaly of said one of said outputs of said wheel-velocity sensors is determined, in accordance with said outputs of said wheel-velocity sensors excluding said abnormal wheel-velocity sensor.

2. The motor vehicle as claimed in claim 1, wherein said pressure-reduction time is measured only when a pressure reduction is carried out with regard to three or more wheels.

3. The motor vehicle as claimed in claim 2, wherein measurement of said pressure-reduction time is cleared when a pressure increase is carried out with regard to two or more wheels.

4. The motor vehicle as claimed in claim 1, wherein said pseudo body velocity is obtained from a select wheel velocity that is the highest of said wheel velocities.

5. The motor vehicle as claimed in claim 4, wherein if said anomaly of said one of said outputs of said wheel-velocity sensors is determined, it is determined that said select wheel velocity in a preceding control cycle is abnormal to exclude said select wheel velocity from calculation of said pseudo body velocity.

6. A method of controlling a motor vehicle provided with wheels, wheel cylinders, a brake unit for controlling pressures within the wheel cylinders, and wheel-velocity sensors for detecting velocities of the wheels, the method comprising the steps of:
    obtaining a pseudo body velocity in accordance with outputs of the wheel-velocity sensors;
    controlling the brake unit in accordance with a difference between each of the wheel velocities and said pseudo body velocity to reduce the pressures for ABS control;
    determining that one of said outputs of the wheel-velocity sensors is abnormal when a pressure-reduction time measured during ABS control exceeds a predetermined value; and
    forming said pseudo body velocity, if an anomaly of said one of said outputs of the wheel-velocity sensors is determined, in accordance with said outputs of the wheel-velocity sensors excluding the abnormal wheel-velocity sensor.

7. The method as claimed in claim 6, wherein said pressure-reduction time is measured only when a pressure reduction is carried out with regard to three or more wheels.

8. The method as claimed in claim 7, wherein measurement of said pressure-reduction time is cleared when a pressure increase is carried out with regard to two or more wheels.

9. The method as claimed in claim 8, wherein said pseudo body velocity is obtained from a select wheel velocity that is the highest of the wheel velocities.

10. The method as claimed in claim 9, wherein if said anomaly of said one of said outputs of the wheel-velocity sensors is determined, it is determined that said select wheel velocity in a preceding control cycle is abnormal to exclude said select wheel velocity from calculation of said pseudo body velocity.

11. A motor vehicle, comprising:
    wheels;
    wheel cylinders arranged with said wheels;
    a brake unit that controls pressures within said wheel cylinders;
    wheel-velocity sensors that detect velocities of said wheels;
    means for obtaining a pseudo body velocity in accordance with outputs of said wheel-velocity sensors;
    means for controlling said brake unit in accordance with a difference between each of said wheel velocities and said pseudo body velocity to reduce said pressures for ABS control;
    means for determining that one of said outputs of said wheel-velocity sensors is abnormal when a pressure-reduction time measured during ABS control exceeds a predetermined value; and
    means for forming said pseudo body velocity, if an anomaly of said one of said outputs of said wheel-velocity sensors is determined, in accordance with said outputs of said wheel-velocity sensors excluding said abnormal wheel-velocity sensor.

* * * * *